Figure 1:
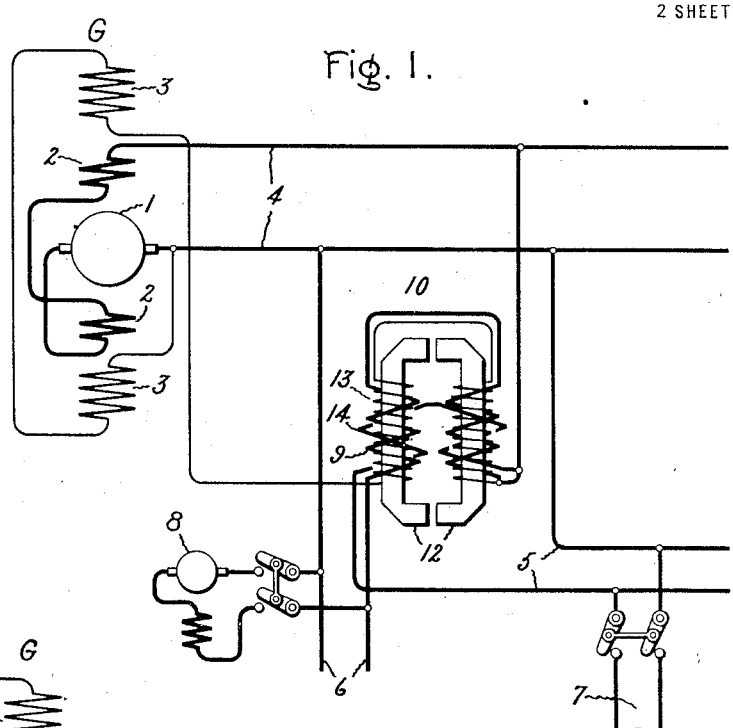

J. D. BALL.
MEANS FOR PREVENTING VOLTAGE FLUCTUATION ON DISTRIBUTION CIRCUITS.
APPLICATION FILED MAR. 27, 1917.

1,313,050.

Patented Aug. 12, 1919.
2 SHEETS—SHEET 1.

Inventor:
John D. Ball,
by Albert G. Davis
His Attorney.

UNITED STATES PATENT OFFICE.

JOHN D. BALL, OF MILWAUKEE, WISCONSIN, ASSIGNOR TO GENERAL ELECTRIC COMPANY, A CORPORATION OF NEW YORK.

MEANS FOR PREVENTING VOLTAGE FLUCTUATION ON DISTRIBUTION-CIRCUITS.

1,313,050. Specification of Letters Patent. Patented Aug. 12, 1919.

Application filed March 27, 1917. Serial No. 157,750.

*To all whom it may concern:*

Be it known that I, JOHN D. BALL, a citizen of the United States, residing at Milwaukee, in the county of Milwaukee, State of Wisconsin, have invented certain new and useful Improvements in Means for Preventing Voltage Fluctuation on Distribution-Circuits, of which the following is a specification.

My invention relates to means for preventing excessive voltage variations in distribution systems, which receive energy from dynamo-electric generators and supply both lighting circuits and motor circuits, when sudden load changes of considerable magnitude occur by reason of the starting or stopping of one or more motors, and is an improvement over the invention of Charles P. Steinmetz which is disclosed and claimed in application, Serial No. 154,835, filed March 14, 1917.

In installations where both lighting and motor circuits are supplied from the same source, if the current demanded by the motor circuits be subject to sudden change, by reason of the simultaneous starting or stopping of one or more motors, and the amount of such change be a sufficiently great proportion of the total current consumed by both lighting and motor circuits, the voltage in the circuits will fluctuate and result in objectionable flickering of the lights. In installations where the motor load consists largely of elevator motors the flickering becomes especially objectionable by reason of the intermittent character of the motor load.

The object of my invention is to overcome objectionable voltage fluctuation on lighting circuits due to fluctuations in the motor load circuits supplied from the same source and thus to eliminate objectionable light flicker.

My invention, and the manner in which it accomplishes the purposes intended, will be more readily understood if the causes of voltage fluctuation in a system of the kind referred to are first briefly considered. Assume, for purposes of explanation, that a 100-volt generator is supplying a lamp load circuit, having one ohm resistance, with 100 amperes. Now, assume that an additional non-inductive load circuit, having a resistance of one ohm, is thrown in parallel with the lamp load circuit. The resistance of the combined load circuit will then be one-half ohm. At the instant of connecting in the latter circuit, the total current in the circuit is only 100 amperes, and, therefore, this 100 amperes will be distributed equally between the parallel circuits, and the line voltage will consequently drop to 50 volts. The discrepancy between the generated E. M. F., amounting to 100 volts, and the line voltage, amounting to 50 volts, tends, however, to rapidly build up the generated current to 200 amperes. The building up (this line) current is, however, retarded principally because of the inductance of the generator circuits and hence a time interval elapses before the generated current attains a value of 200 amperes and, therefore, the dip in the line voltage has a time element which is sufficient to produce a perceptible dimming of the lights. If, after the generated current has attained the value of 200 amperes, the latter circuit be opened, a rise in line voltage will result due to the inherent tendency of the system to maintain the value of the current at 200 amperes. The connection and disconnection of a relatively considerable motor load to one or more dynamo-electric generators, which supply a lighting load, is accompanied by substantially the same effect upon the line voltage as the connection and disconnection of the non-inductive load circuit with the lamp load circuit.

In the case of a motor load, however, the inductance of the motors retards to some extent the changes of current therein and hence has a corrective effect. Also, assuming the extreme case where the entire motor load is thrown on and off, the value of the current which is interrupted, at the moment of throwing off the load, is usually much less than the value of the current at the moment of throwing on the load. This fact makes for less severe voltage fluctuation when the load is thrown off than when it is thrown on.

To avoid the above described objectionable phenomena, I provide means to retard changes in the motor load current to substantially the same degree to which changes in the generator current are retarded. This means, in the illustration of my invention, takes the form of a self-inductive winding, serially connected in the motor load circuit, and preferably, provided with a magnetic core. By proper design said winding may be made to have, by reason of its self-induction, the desired retarding effect upon the changes in motor current.

Another important cause of voltage fluctuation is the mutual induction, between the series and shunt field windings of the generators supplying the distribution circuit, which retards the building up of the field flux upon an increase in the generated, and hence the series, current. Upon an increase in the series field current, tending to increase the field flux, an E. M. F. is induced in the shunt field winding in a direction to reduce the current therein and hence the E. M. F. of the shunt field winding. The momentary result therefore is to maintain the field flux, and hence the E. M. F. developed within the generators, at substantially their former values. The compounding action of the series winding is therefore not immediately effective upon an increase in generated current and hence a drop in line voltage ensues. For similar reason upon a decrease in generated current an increase in line voltage ensues.

To overcome the undesirable effects of the mutual induction between the shunt and series windings and to cause the changes in field flux to follow immediately upon the changes in the current traversing the series winding, I employ a secondary or induced winding, which I arrange in inductive relation to the previously mentioned self-induction winding, which may also be considered an inducing or primary winding located in the motor load circuit, and I connect this secondary winding in series with the shunt field winding. The secondary winding is connected to the shunt field winding so that, upon an increase in the current traversing said self-induction winding, an E. M. F. will be induced in the secondary winding in a direction to oppose the counter E. M. F. induced in said shunt field winding by reason of the increase in the series field current. It necessarily follows that upon a decrease in the current traversing the self-induction winding, an E. M. F. will be induced in the secondary winding in a direction to oppose the E. M. F. induced in the shunt field winding by reason of the decrease in the series field current.

Another factor in the production of undesirable voltage fluctuation is the flux shift in the generators, supplying the distribution circuit, which results when the load current traversing the armature varies. In case the load current increases, the flux will be caused to shift, across the generator field pole faces, in the direction of the rotation of the armature and hence, during the period of flux shift there will result a diminution in the rate at which the armature conductors cut the flux and hence a reduction of the E. M. F. generated in said conductors. On the other hand, if the load current traversing the armature decreases, a flux shift in a direction opposite to the direction of travel of the armature conductors occurs, with the result that during this period the rate at which the armature conductors cut the flux is increased and hence the E. M. F. developed in the armature conductors is increased. The flux shift within the generator may however be compensated for, retarded or prevented and hence the objectionable effect thereof avoided.

To compensate for the flux shift I propose to employ a second secondary or induced winding which I arrange in inductive relation to the previously mentioned self-induction winding, located in the motor circuit, and which I connect in series with the lamp, or other load, circuit on which it is desired that voltage fluctuation be avoided. This latter secondary winding is so related to the self-induction winding and the lamp circuit, that upon an increase in the current traversing said self-induction winding an E. M. F. will be induced in the secondary winding in a direction to boost the voltage on the lamp circuit. Likewise upon a decrease in the current traversing the self-induction winding an E. M. F. will be induced in the secondary winding in a direction to lower the voltage on the lamp circuit.

If it be desired to retard the flux shift within the generator, this may be accomplished by mounting an amortisseur winding upon the generator field pole faces.

If it be desired to prevent the flux shift within the generator, this may be accomplished by providing the generator with a compensating winding connected in series with the armature.

Figure 2:
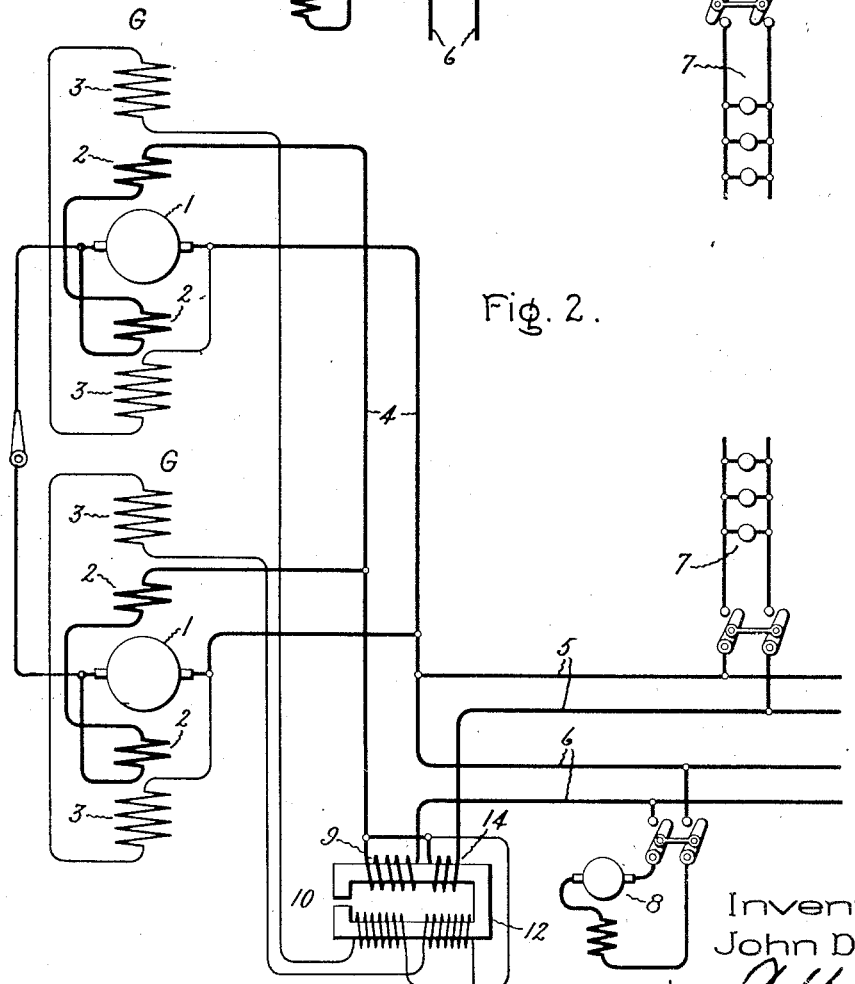
Figure 3:
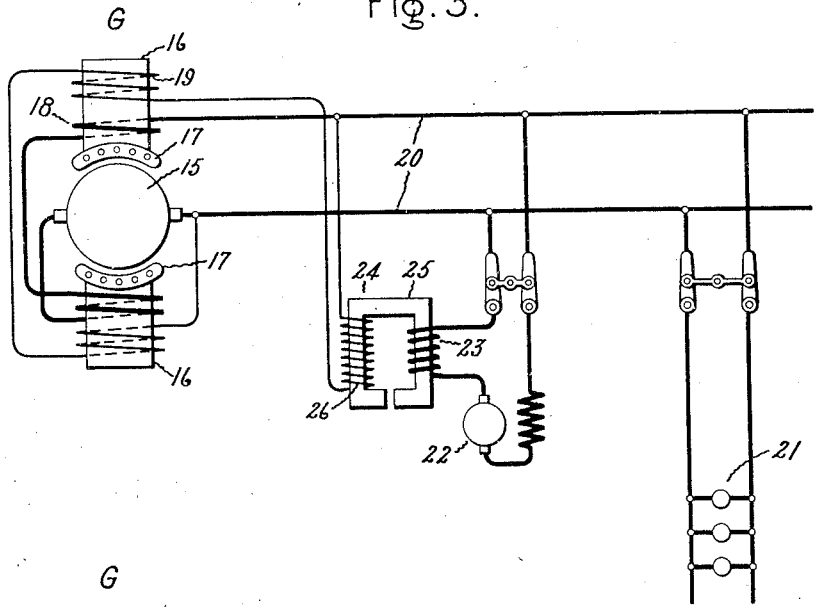
Figure 4:
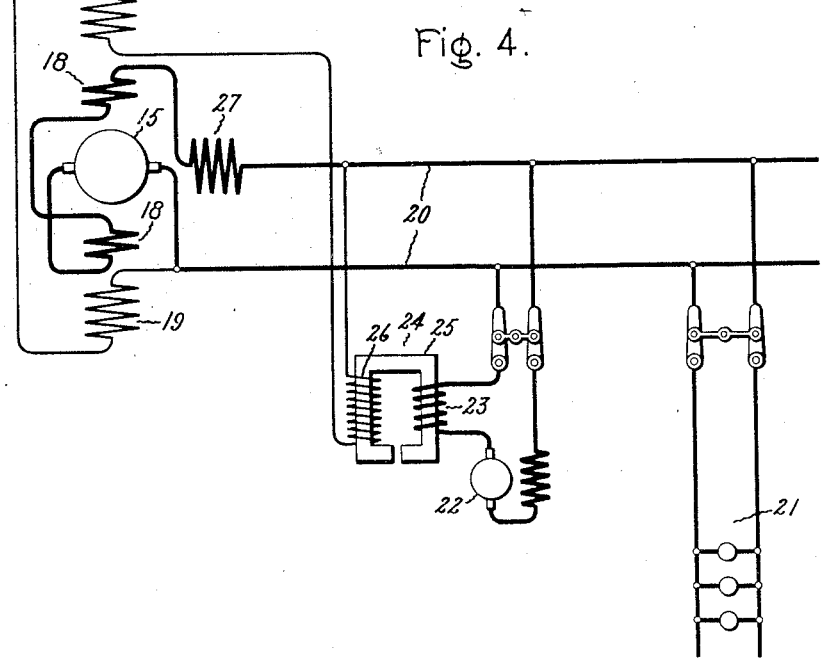

My invention will be more readily understood by reference to the accompanying drawing in which: Figure 1 is a diagrammatic view of an embodiment of my invention wherein a secondary winding is connected to the lighting load circuits; Fig. 2 is a diagrammatic view of an embodiment of my invention similar to that shown in Fig. 1, but involving a plurality of generators; Fig. 3 is a diagrammatic view of an embodiment of my invention wherein amortisseur windings, associated with the generator field poles, are employed instead of a secondary winding connected to the lighting load circuits; and Fig. 4 is a diagrammatic view of an embodiment of my invention, differing from that of Fig. 3, in that the generator is provided with a compensating winding instead of amortisseur windings.

Referring to Fig. 1, the generator G having the armature 1, a series field winding 2, and a shunt field winding 3, is adapted to supply current to the mains 4, from which lighting buses 5 and motor buses 6 are adapted to be energized. To the lighting buses 5 may be connected one or more lighting circuits 7 and to the motor buses 6 may be connected one or more motors 8. The winding 9 of a self-induction device 10 is connected to the motor buses 6 so as to be traversed by current supplied thereto from the mains 4. The winding 9 is preferably wound upon a core 12 which may be provided with one or more air gaps. These serve to straighten out the magnetization of said core and also to raise the point of saturation and will therefore usually be desirable although under some conditions they may be dispensed with. These air gaps preferably should be capable of adjustment to vary the effect thereof upon the magnetic circuit in which they are located. According to the showing of Fig. 1, the core 12 comprises two similarly U-shaped parts with air gaps therebetween, and the winding 9 is divided into two portions which are respectively wound on said parts. In inductive relation with the winding 9 is arranged a secondary winding 13 which is connected in series with the shunt field winding 3 of the generator. The winding 13 comprises two portions wound coaxially with the two portions of winding 9. A second secondary winding 14 is also arranged in inductive relation with the winding 9, and is connected to the lighting buses 5 so that it will be traversed by current supplied thereto by the mains 4. The last named secondary winding likewise comprises two portions which are wound coaxially with the two portions of winding 9. While the coaxial arrangement of the several windings is preferable, where a core having an air gap is employed, the particular arrangement shown is not essential and is advantageous merely to reduce leakage. The self-induction device 10 should be designed and constructed so that the building up of the current supplied to the motor buses through the self-induction winding 9 will be retarded to substantially the same degree as the building up of the generated current, so that the E. M. F. in the secondary winding 13 will have the proper effect in the shunt field winding and so that the E. M. F. induced in the secondary winding 14 will compensate for the voltage fluctuations on the lighting buses 5 caused by the flux shift within the generator. The design of the inductive device to accomplish these several functions involves merely the ordinary problems which are met with in the construction of this type of apparatus.

The operation of the embodiment of my invention illustrated in Fig. 1, as at present understood, is as follows: Assume the generator to be supplying the lighting load. If now a motor load or, in case the generator has been supplying a motor load in addition to the lighting load, an increase in the motor load be thrown on the generator, the winding 9 through which the motor current must flow will, by reason of its self induction, retard the building up of the motor current to substantially the same extent as the building up of the generator current is retarded by the inherent inductive action of the generator circuits. This retardation in the building up of the motor current will prevent a division of the current supply to the lighting load at the moment of throwing on or increasing the motor load. The secondary winding 13 will furthermore have induced therein an E. M. F. in a direction which will prevent a reduction in the shunt field current resulting from an increase in the current in the series field winding. The secondary winding 14 will furthermore have induced therein an E. M. F. in a direction to boost the voltage impressed upon the lighting buses 5. The net result of the action of the several windings is therefore to maintain the voltage on the lighting buses 5 substantially constant and hence to prevent flickering of the lights which are supplied therefrom.

Upon a decrease in the motor load the self-induction winding 9 will delay or retard the building down of the motor current. The secondary winding 13 will have induced therein an E. M. F. in a direction which will prevent an increase in the shunt field current resulting from a decrease in the current in the series field winding and the secondary winding 14 will have induced therein an E. M. F. in a direction to lower the voltage impressed upon the lighting buses 5.

Referring to Fig. 2 a plurality of generators G having armatures 1, series field windings 2, and shunt field windings 3 are adapted to supply current to the mains, or buses, 4, from which lighting buses 5 and motor buses 6 are adapted to be energized. One or more lighting circuits 7 are adapted to be connected to the lighting buses 5, and one or more motors 8 are adapted to be operated from the motor buses 6. A winding 9 of a self-induction device 10 is connected to the motor buses 6 so as to be traversed by current supplied thereto by the mains 4. Said winding 9 is wound upon a core 12. In inductive relation with the winding 9 are arranged the secondary windings 13 which are connected respectively in series with the shunt field windings of the generators G. Said secondary windings 13 are also arranged upon the core 12. The other secondary winding 14 is arranged in inductive relation to the winding 9 and is connected to the lighting buses 5 so as to be traversed by the current supplied thereto by the mains 4. The operation of the system shown in Fig. 2 is substantially the same as that shown in Fig. 1, and differs therefrom merely in the provision of a plurality of secondary windings 13 adapted to be respectively connected in series with the shunt field windings of a plurality of generators G.

Referring to Fig. 3, the generator G having an armature 15 and field poles 16, the faces of which are provided with amortisseur windings 17, is provided with a series field winding 18 and a shunt field winding 19. Said generator is adapted to supply current to the mains 20 from which one or more lighting circuits 21 and one or more motor circuits 22 are adapted to be energized. A winding 23 of a self induction device 24 is connected to the motor circuit 22, so as to be traversed by current supplied thereto by the mains 20. Said winding 23 is preferably wound upon a core 25. A secondary winding 26 is arranged upon the core 25 in inductive relation to the winding 23 and is connected in series with the shunt field winding 19.

The windings 23 and 26 of the inductive device function in the same manner as windings 9 and 13 of Fig. 1. Instead of the secondary winding 14 which, in Fig. 1, is employed principally to compensate for the flux shift within the generator, the amortisseur windings 17 are employed to retard such flux shift and therby render the effect of such flux shift upon the voltage negligible.

In the modifications shown in Fig. 4 parts identical with those involved in the modification shown in Fig. 3 are designated by like reference characters. This modification differs from that of Fig. 3 simply in the use of a compensating winding 27 instead of the amortisseur windings 17. The compensating winding 27, however, performs a function similar to that performed by the amortisseur winding 17 except that it positively prevents, rather than merely retards, the flux shift within the generator.

For purposes of explanation and analysis independent corrective functions have been attributed to the various elements of the combination constituting my invention. In any particular embodiment of my invention, however, it is probable that, although the said elements coöperate to accomplish the intended ultimate result, they will not individually and exclusively overcome the respective causes of voltage fluctuation, the consideration of which has prompted their use.

However, by varying the design, arrangement and proportions of said elements and thereby varying the corrective action of the individual elements the resultant action best suited to any particular system may be obtained.

The selection of one or another of the expedients herein described, for overcoming the effect of flux shift, will be largely determined by the relative ease of application and under some conditions it may be desirable to employ more than one of said expedients in the same system.

I conceive that various modifications of my invention may be made, and I accordingly do not desire to be limited to the exact arrangement herein, described and shown, but seek to cover in the appended claims all such modifications and arrangements as fall within the scope and spirit of my invention.

What I claim as new and desire to secure by Letters Patent of the United States, is:—

1. The combination with a generator having shunt and series field windings of a plurality of load circuits adapted to be energized thereby, one of said load circuits being connected to a variable load, mutually inductive windings, one of which is serially connected in the load circuit, which is connected to a variable load, and constitutes a self-inductive, inducing winding, and another of which is connected in series with the shunt field winding and constitutes an induced winding, and means for preventing voltage fluctuation on another of such load circuits due to flux shift within the generator.

2. The combination with a generator having shunt and series field windings of a plurality of load circuits adapted to be energized thereby, and mutually inductive windings one of which is connected in series with one of said load circuits and constitutes a self-inductive, inducing winding, another of which is connected in series with the shunt field winding and constitutes an induced winding, and another of which is connected in series with another load circuit and constitutes an induced winding.

3. The combination with a generator having shunt and series field windings of a plurality of load circuits adapted to be energized thereby, one of said load circuits being connected to a variable load, and mutually inductive windings mounted upon a magnetic core, one of the last named windings being connected in series with the load circuit, which is connected to a variable load, and constituting a self-inductive, inducing winding, another of the last named windings being connected in series with the shunt field winding and constituting an induced winding, and another of the last named windings being connected in series with another load circuit and constituting an induced winding.

4. The combination with a direct current generator provided with shunt and series field windings of a lighting load circuit and a motor load circuit, and means, for maintaining a substantially uniform voltage on the lighting load circuit, comprising mutually inductive windings, one of which is connected in series with the motor load circuit and constitutes a self-inductive, inducing winding, another of which is connected in series with the shunt field winding and constitutes an induced winding, and another of which is connected in series with the lighting load circuit and constitutes an induced winding, said windings being so arranged and connected that the magnetomotive force developed by the shunt field current flowing in one of the induced windings and the magnetomotive force developed by the lighting load current flowing in another of the induced windings both oppose the magnetomotive force developed by the motor load current flowing in the inducing winding.

5. The combination with a generator having shunt and series field windings of a plurality of load circuits adapted to be energized thereby, one of such circuits being connected to a variable load, a self-inductive, inducing winding adapted to be traversed only by the current supplied to the last named circuit and to retard the changes in the value of said current, an induced winding inductively related to said inducing winding and connected in series with said shunt field winding so as to oppose the effect upon the current in the shunt field winding of changes in the series field current, and an induced winding inductively related to said inducing winding and connected in series with another load circuit so as to tend to raise the voltage in said load circuit upon an increase in the current supplied to the variable load and to lower the voltage in the said circuit upon a decrease in the current supplied to the variable load.

6. The combination with a plurality of generators provided with shunt and series field windings of a lighting load circuit and a motor load circuit adapted to be energized thereby, and means, for maintaining a substantially uniform voltage on the lighting load circuit, comprising mutually inductive windings, one of which is connected in series with the motor load circuit and constitutes a self-inductive, inducing winding, another of which is connected in series with the lighting load circuit and constitutes an induced winding, and others of which are respectively connected in series with the shunt field windings of the several generators and constitute induced windings, said inducing and induced windings being so arranged and connected that the magnetomotive force developed in the induced windings, which are connected in series with the shunt field windings, by the shunt field current flowing therein, and the magnetomotive force developed in the induced winding, which is connected in series with the lighting load circuit, by the lighting load current flowing therein oppose the magnetomotive force developed in the inducing winding, which is connected in series with the motor load circuit, by the motor load current flowing therein.

7. The combination with a direct current generator provided with shunt and series field windings of a lighting load circuit and a motor load circuit, and means, for maintaining substantially non-fluctuating voltage on the lighting load circuit, comprising a magnetic core and mutually inductive windings associated therewith, said core being divided into two parts separated by air gaps, and said mutually inductive windings being each divided into two electrically connected portions which are mounted on different parts of the core, one of the mutually inductive windings being connected in series with the motor load circuit and constituting a self-inductive, inducing winding, another of the mutually inductive windings being connected in series with the shunt field winding and constituting an induced winding, and another of the mutually inductive windings being connected in series with the lighting load circuit and constituting an induced winding, said mutually inductive windings being so arranged and connected that the magnetomotive force developed in the induced winding, which is connected in series with the shunt field winding, by the shunt field current flowing therein and the magnetomotive force developed in the induced winding, which is connected in series with the lighting load circuit, by the lighting load current flowing therein, each opposes the magnetomotive force developed in the inducing winding, which is connected in series with the motor load circuit, by the motor load current flowing therein.

In witness whereof, I have hereunto set my hand this 23 day of March, 1917.

JOHN D. BALL.